US007516321B2

(12) United States Patent
Chen et al.

(10) Patent No.: US 7,516,321 B2
(45) Date of Patent: Apr. 7, 2009

(54) METHOD, SYSTEM AND DEVICE FOR ENABLING DELEGATION OF AUTHORITY AND ACCESS CONTROL METHODS BASED ON DELEGATED AUTHORITY

(75) Inventors: Liqun Chen, Bristol (GB); Stephen James Crane, Bristol (GB); Cheh Goh, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 1024 days.

(21) Appl. No.: 10/797,715

(22) Filed: Mar. 8, 2004

(65) Prior Publication Data

US 2005/0058294 A1 Mar. 17, 2005

(51) Int. Cl.
*H04L 9/00* (2006.01)
(52) U.S. Cl. .................. 713/155; 713/159; 713/161; 713/169; 713/170; 713/171; 380/259; 380/277; 380/278; 380/281; 380/283
(58) Field of Classification Search .................. 713/155, 713/170, 171, 159, 161, 169; 380/259, 277, 380/278, 281, 283
See application file for complete search history.

(56) References Cited

U.S. PATENT DOCUMENTS

2004/0098589 A1* 5/2004 Appenzeller et al. ........ 713/170

FOREIGN PATENT DOCUMENTS

WO  01/82092 A1  11/2001

OTHER PUBLICATIONS

Boneh, D. and M. Franklin, "Identity-Based Encryption from the Weil Pairing," *Advances in Cryptology—CRYPTO 2001*, LNCS 2139, pp. 213-229, Springer-Verlag (2001).
Boneh, D. and M. Franklin, "Identity-Based Encryption from the Weil Pairing," SIAM Journal on Computing, vol. 32, No. 3, pp. 586-615 (2003).
Boneh, D., et al., "Identity-Based Mediated RSA," *3rd Workshop on Information Security Application*, Jeju Island, Korea, 12 pages (Aug. 2002).
Chen, L., et al., "Certification of Public Keys Within an Identity Based System," *Proceedings of Information Security Conference 2002*, ed. A.H. Chan and V. Gligor, LNCS 2433, pp. 322-333, Sprinter-Verlag (2002).

(Continued)

*Primary Examiner*—Kambiz Zand
*Assistant Examiner*—Kari L Schmidt
(74) *Attorney, Agent, or Firm*—Robert F. Squibbs (57) ABSTRACT

A trusted authority delegates authority to a device. This delegation of authority is effected by providing a yet-to-be completed chain of public/private cryptographic key pairs linked in a subversion-resistant manner. The chain terminates with a penultimate key pair formed by public/private data, and a link towards an end key pair to be formed by an encryption/decryption key pair of an Identifier-Based Encryption, IBE, scheme. The private data is securely stored in the device for access only by an authorized key-generation process that forms the link to the end key pair and is arranged to provide the IBE decryption key generated using the private data and encryption key. This key generation/provision is normally only effected if at least one condition, for example specified in the encryption key, is satisfied. Such a condition may be one tested against data provided by the trusted authority and stored in the device.

43 Claims, 5 Drawing Sheets

OTHER PUBLICATIONS

Chen, Soldera, Moss and Smart, "Certification of Public Keys Within an Identity Based System," esp. Section 4 and 5, Information Security 5th International Conference, pp. 322-333 (2002).

Cocks, C., "An Identity Based Encryption Scheme Based on Quadratic Residues," *Proceedings of the 8th IMA International Conference on Cryptography and Coding*, LNCS 2260, pp. 360-363, Springer-Verlag (2001).

Trusted Computing Platform Alliance, TCPA PC Specific Implementation Specification Version 1.00, 284 pages (Sep. 9, 2001).

\* cited by examiner

METHOD, SYSTEM AND DEVICE FOR ENABLING DELEGATION OF AUTHORITY AND ACCESS CONTROL METHODS BASED ON DELEGATED AUTHORITY

FIELD OF THE INVENTION

The present invention relates to a method, system and device for enabling delegation of authority (for example, to a user device), and to data access and service access control methods based on delegated authority; more particularly, the present invention relates to such methods and system involving Identifier-Based Encryption.

As used herein, references to the provision of a service are to be broadly understood to include, without limitation, transactional services, information services and services that provide access to a data component such as software or digital media.

BACKGROUND OF THE INVENTION

Identifier-Based Encryption (IBE) is an emerging cryptographic schema. In this schema (see FIG. 1 of the accompanying drawings), a data provider 10 encrypts payload data 13 using both an encryption key string 14, and public data 15 provided by a trusted authority 12. This public data 15 is derived by the trusted authority 12 using private data 17 and a one-way function 18. The data provider 10 then provides the encrypted payload data <13> to a recipient 11 who decrypts it, or has it decrypted, using a decryption key computed by the trusted authority 12 in dependence on the encryption key string and its own private data.

A feature of identifier-based encryption is that because the decryption key is generated from the encryption key string, its generation can be postponed until needed for decryption.

Another feature of identifier-based encryption is that the encryption key string is cryptographically unconstrained and can be any kind of string, that is, any ordered series of bits whether derived from a character string, a serialized image bit map, a digitized sound signal, or any other data source. The string may be made up of more than one component and may be formed by data already subject to upstream processing. In order to avoid cryptographic attacks based on judicious selection of a key string to reveal information about the encryption process, as part of the encryption process the encryption key string is passed through a one-way function (typically some sort of hash function) thereby making it impossible to choose a cryptographically-prejudicial encryption key string. In applications where defence against such attacks is not important, it would be possible to omit this processing of the string.

Frequently, the encryption key string serves to "identify" the intended message recipient and the trusted authority is arranged to provide the decryption key only to this identified intended recipient. This has given rise to the use of the label "identifier-based" or "identity-based" generally for cryptographic methods of the type under discussion. However, depending on the application to which such a cryptographic method is put, the string may serve a different purpose to that of identifying the intended recipient and may be used to convey other information to the trusted authority or, indeed, may be an arbitrary string having no other purpose than to form the basis of the cryptographic processes. Accordingly, the use of the term "identifier-based" or "IBE" herein in relation to cryptographic methods and systems is to be understood simply as implying that the methods and systems are based on the use of a cryptographically unconstrained string whether or not the string serves to identify the intended recipient. Generally, in the present specification, the term "encryption key string" or "EKS" is used rather than "identity string" or "identifier string"; the term "encryption key string" is also used in the shortened form "encryption key" including when referring jointly to the encryption key string and the corresponding decryption key as an encryption/decryption key pair.

Figure 2:
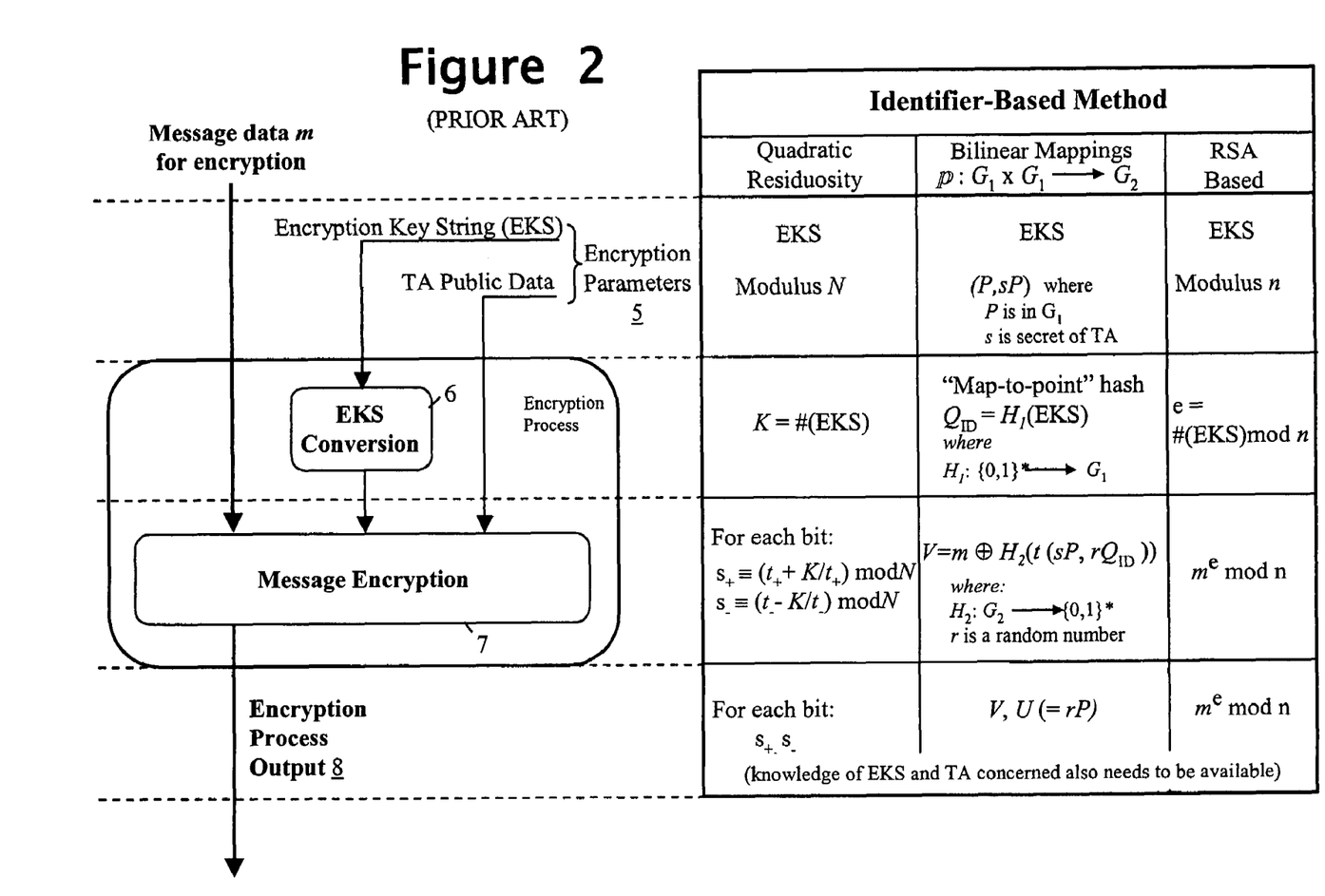
FIG. 2 is a diagram illustrating how certain IBE operations are implemented by three different prior art IBE methods.

A number of IBE algorithms are known and FIG. 2 indicates, for three such algorithms, the following features, namely:

the form of the encryption parameters 5 used, that is, the encryption key string and the public data of the trusted authority (TA);

the conversion process 6 applied to the encryption key string to prevent attacks based on judicious selection of this string;

the primary encryption computation 7 effected;

the form of the encrypted output 8.

The three prior art IBE algorithms to which FIG. 2 relates are:

Quadratic Residuosity (QR) method as described in the paper: C. Cocks, "An identity based encryption scheme based on quadratic residues", Proceedings of the 8$^{th}$ IMA International Conference on Cryptography and Coding, LNCS 2260, pp 360-363, Springer-Verlag, 2001. A brief description of this form of IBE is given hereinafter.

Bilinear Mappings p using, for example, a modified Tate pairing t or modified Weil pairing e for which:

$p: G_1 \times G_1 \to G_2$ where $G_1$ and $G_2$ denote two algebraic groups of prime order q and $G_2$ is a subgroup of a multiplicative group of a finite field. For the Tate pairing an asymmetric form is also possible:

$p: G_1 \times G_0 \to G_2$ where $G_0$ is a further algebraic group the elements of which are not restricted to being of order q. Generally, the elements of the groups $G_0$ and $G_1$ are points on an elliptic curve though this is not necessarily the case. A description of this form of IBE method, using modified Weil pairings is given in the paper: D. Boneh, M. Franklin—"Identity-based Encryption from the Weil Pairing" in *Advances in Cryptology—CRYPTO* 2001, LNCS 2139, pp. 213-229, Springer-Verlag, 2001.

RSA-Based methods The RSA public key cryptographic method is well known and in its basic form is a two-party method in which a first party generates a public/private key pair and a second party uses the first party's public key to encrypt messages for sending to the first party, the latter then using its private key to decrypt the messages. A variant of the basic RSA method, known as "mediated RSA", requires the involvement of a security mediator in order for a message recipient to be able to decrypt an encrypted message. An IBE method based on mediated RSA is described in the paper "Identity based encryption using mediated RSA", D. Boneh, X. Ding and G. Tsudik, 3rd Workshop on Information Security Application, Jeju Island, Korea, Aug., 2002.

In all of the above cases, the decryption key is generated by a trusted authority in dependence on the encryption key string.

A more detailed description of the QR method is given below with reference to the entities depicted in FIG. 1 and using the same notation as given for this method in FIG. 2. In the QR method, the trust authority's public data 15 comprises a value N that is a product of two random prime numbers p and q, where the values of p and q are the private data 17 of the trust authority 12. The values of p and q should ideally be in the range of $2^{511}$ and $2^{512}$ and should both satisfy the equation: p, q≡3 mod 4. However, p and q must not have the same value. Also provided is a hash function # which when applied to a string returns a value in the range 0 to N−1.

Each bit of the user's payload data 13 is then encrypted as follows:

The data provider 10 generates random numbers $t_+$ (where $t_+$ is an integer in the range $[0, 2^N]$) until a value of $t_+$ is found that satisfies the equation jacobi($t_+$,N)=m', where m' has a value of −1 or 1 depending on whether the corresponding bit of the user's data is 0 or 1 respectively. (As is well known, the jacobi function is such that where $x^2 \equiv$ #mod N the jacobi (#, N)=−1 if x does not exist, and =1 if x does exist). The data provider 10 then computes the value:

$$s_+ \equiv (t_+ + K/t_+) \bmod N$$

where: $s_+$ corresponds to the encrypted value of the bit m' concerned, and $$K = \#(\text{encryption key string})$$

Since K may be non-square, the data provider additionally generates additional random numbers $t\_$ (integers in the range $[0, 2^N)$) until one is found that satisfies the equation jacobi($t\_$, N)=m'. The data provider 10 then computes the value:

$$s\_ \equiv (t\_ - K/t\_) \bmod N$$

as the encrypted value of the bit m concerned.

The encrypted values $s_+$ and $s\_$ for each bit m' of the user's data are then made available to the intended recipient 11, for example via e-mail or by being placed in a electronic public area; the identity of the trust authority 12 and the encryption key string 14 will generally also be made available in the same way.

The encryption key string 14 is passed to the trust authority 12 by any suitable means; for example, the recipient 11 may pass it to the trust authority or some other route is used—indeed, the trust authority may have initially provided the encryption key string. The trust authority 12 determines the associated private key B by solving the equation:

$$B^2 \equiv K \bmod N \text{ ("positive" solution)}$$

If a value of B does not exist, then there is a value of B that is satisfied by the equation:

$$B^2 \equiv -K \bmod N \text{ ("negative" solution)}$$

As N is a product of two prime numbers p, q it would be extremely difficult for any one to calculate the decryption key B with only knowledge of the encryption key string and N. However, as the trust authority 12 has knowledge of p and q (i.e. two prime numbers) it is relatively straightforward for the trust authority 12 to calculate B.

Any change to the encryption key string 14 will result in a decryption key 16 that will not decrypt the payload data 13 correctly. Therefore, the intended recipient 11 cannot alter the encryption key string before supplying it to the trust authority 12.

The trust authority 12 sends the decryption key to the data recipient 11 along with an indication of whether this is the "positive" or "negative" solution for B.

If the "positive" solution for the decryption key has been provided, the recipient 11 can now recover each bit m' of the payload data 13 using:

$$m' = \text{jacobi}(s_+ + 2B, N)$$

If the "negative" solution for the decryption key B has been provided, the recipient 11 recovers each bit m' using:

$$m' = \text{jacobi}(s\_ + 2B, N)$$

Figure 1:
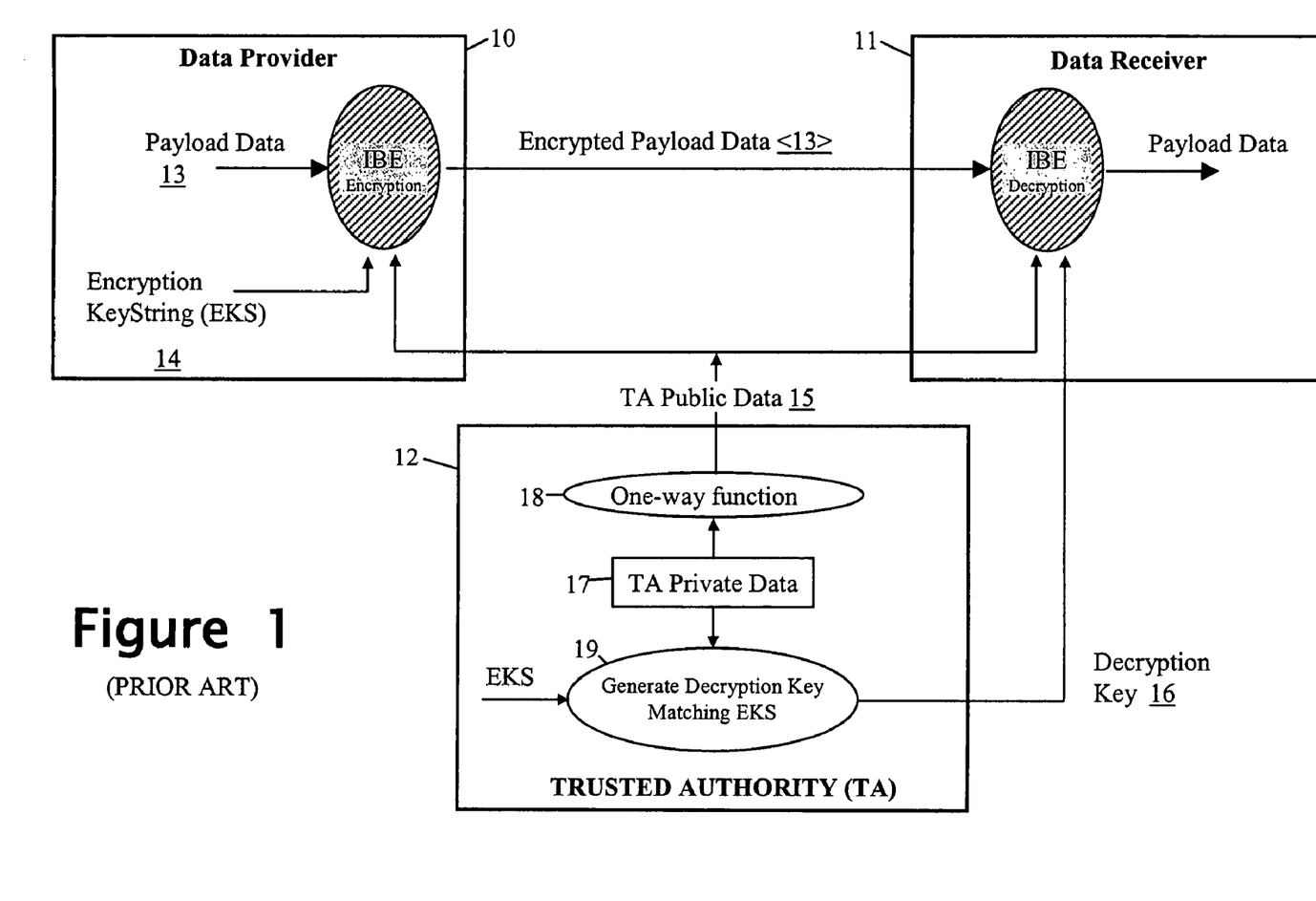
FIG. 1 is a diagram illustrating the operation of a prior art encryption schema known as Identifier-Based Encryption.

An IBE system such as shown in FIG. 1 can be adapted to provide access control to a service. Thus, for example, if the data provider 10 of FIG. 1 is providing the payload data 13 as a service but only to parties that meet certain conditions, the provider 10 can encrypt the data using an encryption key string 14 that specifies these conditions. The recipient 11 (a party wishing to receive the service—that is, wishing to access the payload data) can only decrypt the encrypted payload data <13> by obtaining the decryption key 16 from the trusted authority 12; however, the trusted authority is arranged to provide the decryption key only if the conditions specified in the encryption key string 14 are satisfied by the recipient. The conditions to be satisfied may, for example, be related to the identity of the recipient and/or to whether the recipient has paid an associated service fee. Even though the encryption key string 14 will generally be passed to the trusted authority by the recipient 11, the latter cannot successfully change any of the contained conditions since to do so will mean that any resultant decryption key will be useless for decrypting data encrypted by the provider 10 using the original encryption key string 14.

In the above example, every party (such as recipient 11) wishing to receive the service must individually contact the trusted authority 12 to obtain the decryption key and must do each time the conditions in the encryption key string 14 are changed. Indeed, since the service provider will typically wish to ensure that the recipient 11 currently meets the specified conditions each time the service is requested, the service provider will normally include a nonce in the encryption key string 14 to force the recipient 11 to contact the trusted authority for a new decryption key every time the service is wanted. Where there are a large number of parties wishing to receive the service, the resultant load on the decryption-key generation functionality of the trusted authority risks becoming impractically large.

It is an object of the present invention to reduce the load on the trusted authority.

SUMMARY OF THE INVENTION

In general terms, the present invention involves a trusted authority delegating its key-provision authority to another device such as a PDA. This device should have characteristics enabling it to be trusted by a service provider; however, these characteristics need not provide an absolute guarantee regarding non-abusive use of the delegated authority, but merely a level of reassurance sufficient for the service provider to accept the device in its role as a delegate for the trusted authority.

According to a first aspect of the present invention, there is provided a method of delegating key-provision authority to a device from a trusted authority, the method comprising providing a yet-to-be completed chain of public/private cryptographic key pairs linked in a subversion-resistant manner and comprising:

a starting key pair formed by a public/private key pair of the trusted authority, a penultimate key pair formed by public/private data, the private data being securely stored in the device for access only under circumstances that have been pre-authorised by the trusted authority and comprise a specific key-generation process running in a subversion-resistant operating environment, and a link between the penultimate key pair and an end key pair to be formed by an encryption/decryption key pair of an Identifier-Based Encryption, IBE, scheme; this link being said key-generation process arranged to execute in said subversion-resistant operating environment on the device to generate said decryption key using said private data and the IBE encryption key and to make the generated key available for use.

The device can now serve as a delegate for the trusted authority (for example, in controlling service access), the chain of key pairs providing assurance that the device is acting with authorisation from the trusted authority when generating a decryption key. As a result, the trusted authority is relieved of having to generate decryption keys for the device.

In most embodiments, the key generation process is arranged to generate and/or make available the decryption key only if the process is satisfied that at least one condition has been met; typically, this at least one condition comprises a condition to be presented to the device in the IBE encryption key. The task of condition checking will generally be one that has been delegated to the device from the trusted authority.

At least one condition that is to be met may be one requiring that particular data stored in the device meets criteria specified in the condition, this data having been provided by the trusted authority and stored in the device protected against subversion. Alternatively or additionally, a condition to be met may concern input data to be presented by a user of the device, for example, that this input data has a predetermined relationship with particular data stored in the device.

Preferably, the penultimate key pair is the second key pair in the chain, the start key pair and penultimate key pair being linked by the public data being certified by the trusted authority, using its private key, to indicate that an entity holding the corresponding private data is one to which it has delegated authority.

Advantageously, the device comprises a trusted platform arranged to execute the key-generation process in said subversion-resistant operating environment; in this case, the trusted authority preferably checks the trusted platform status of the device. Advantageously, the IBE public data and any said particular data are held in protected storage and only accessible by the key-generation process when executing in the subversion-resistant operating environment.

Other aspects of the invention are set out in the accompanying claims. The present invention encompasses not only methods but also systems and device.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 3:
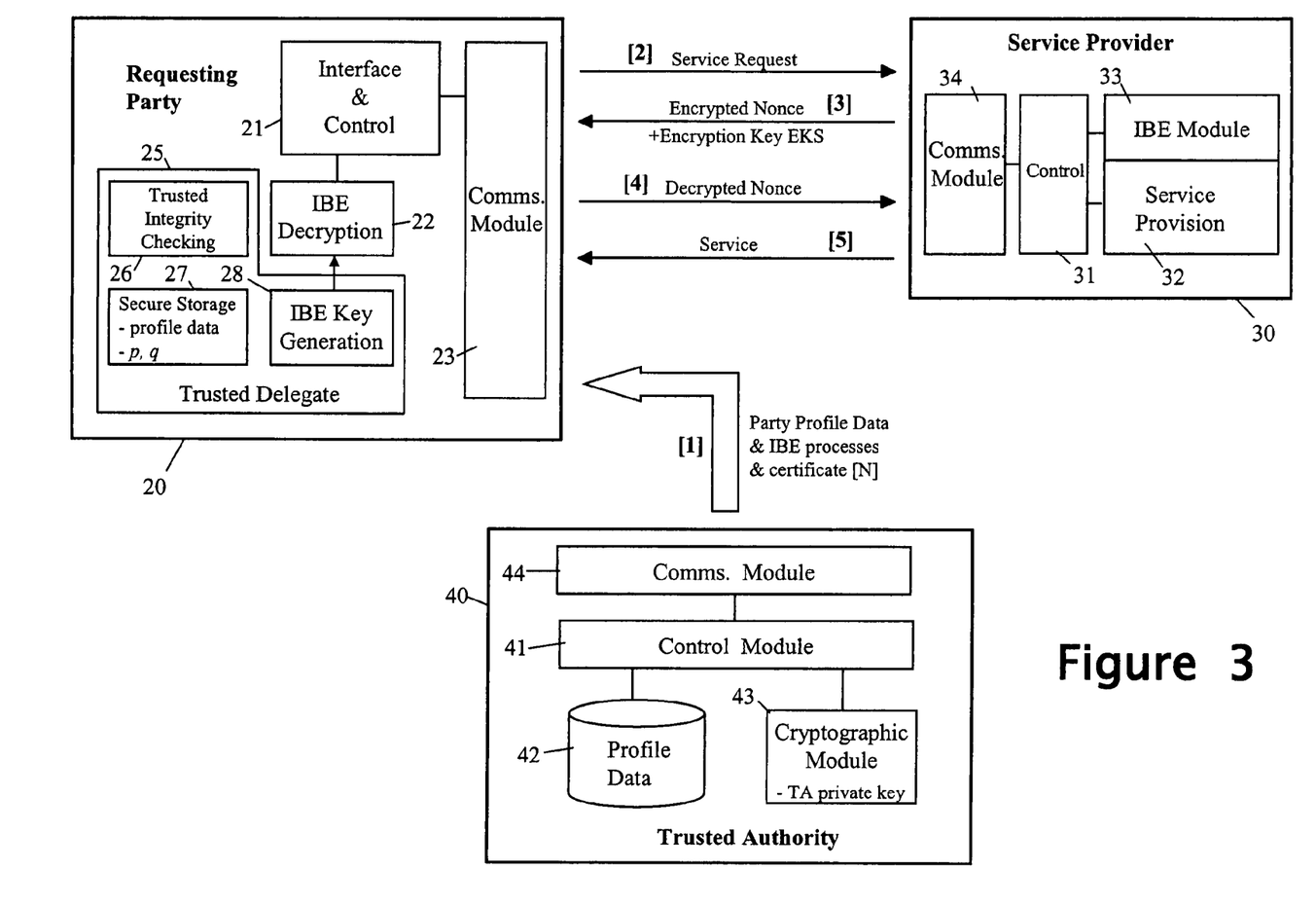
FIG. 3 is a diagram of an embodiment of the present invention.

FIG. 3 illustrates a system comprising a first computing entity 20 (such as a personal digital assistant) associated with a party wishing to receive a service, a second computer entity 30 associated with a provider of that service, and a third computing entity associated with a trusted authority competent in respect of profile information about the party (that is, trusted as authoritative concerning that data). The computing entities 20, 30 and 40 inter-communicate as needed via, for example, the internet or other computer network though it is also possible that the entities 30 and 40 actually reside on the same computing platform.

In the following, references to the requesting party, service provider and trusted authority are generally used interchangeably with references to their respective computing entities 20, 30, 40.

The FIG. 3 employs Identifier-Based Encryption (in the present case, the QR IBE method) to enable the service provider 30 to specify conditions to be met by parties wishing to receive the service it provides, and to rely on a party only being able to access the service if these conditions are indicated as being met according to the authoritative profile data provided by the trusted authority 40. However, the checking of the conditions specified by the service provider 30 against the profile data of a party 20 requesting the service is not done by the trusted authority itself but is delegated by it to a trusted delegate entity 25 forming part of the requesting-party's computing entity 20.

More particularly, after checking the trustworthiness of the entity 25, the trusted authority 40 delegates authority to the entity 25 by loading the party's profile data into the entity 25 and providing it with functionality for generating an IBE decryption key subject to having first confirmed that the conditions specified by the service provider 30 are satisfied by the loaded profile data. The trusted delegate entity 25 securely stores private data p,q and the trusted authority 40 certifies related public data N to indicate that the entity holding the corresponding private data is one to which it has delegated authority.

Following the delegation of authority to the trusted delegate entity 25, the entity 25 is ready to act independently of the trusted authority in checking, on as many occasions as may be required, whether the party qualifies to receive a service it has requested from the service provider 30.

Upon the party 20 requesting service provision from the service provider 30, the service provider encrypts data using the public data N and an IBE encryption key (that is, an encryption key string EKS as described in the introduction), and returns the encrypted data to the party 20 who must now decrypt the data to receive the requested service. The encryption key EKS, which is also provided to the party 20, indicates the conditions that must be satisfied by the party's profile data to be met returns encrypted data which the party must decrypt to receive the service. The requesting party passes the encryption key EKS to the trusted delegate entity 25 which checks whether the indicated conditions are met by the profile data stored for the party and, if so, generates a decryption key using the encryption key EKS and the stored private data p, q. The decryption key is then used by entity 20 to decrypt the encrypted data provided by the service provider whereby to gain access to the service.

Because the public data N has been certified by the trusted authority 40, the service provider 30 can be confident that the decryption key can only be provide by a trusted delegate of the authority 40.

As can be seen, so far as the IBE cryptographic processes are concerned, the entity 20 (excluding the entity 25), entity 30, and entity 25 of the FIG. 3 embodiment have roles corresponding to those of the data recipient 11, the data provider 10, and trusted authority 12 of the FIG. 1 IBE arrangement.

Considering the FIG. 3 system in more detail, the requesting-party entity 20 comprises an interface and control module 21 providing a user interface for managing interaction with the service-provider entity 30; an IBE decryption module for decrypting encrypted data provided by the service provider entity 30; the trusted delegate entity 25 for providing an IBE decryption key to the decryption module 22 upon determining that the conditions specified in the IBE encryption key EKS used by the service provider entity 30 are met by the profile data held by the entity 25; and a communications module 23 for communicating with the entities 30 and 40.

The trusted delegate entity 25 is a trusted computing platform with trusted functions, verifiable hardware/software configuration, protected storage and related functions, such as specified, for example, in "TCPA—Trusted Computing Platform Alliance Main Specification v1.1" www.trusted-computing.org, 2001 and described in the book "trusted computing platforms—tcpa technology in context"; Pearson (editor); Prentice Hall; ISBN 0-13-009220-7". Other forms of trusted platform can alternatively be used as will be apparent to persons skilled in the art; however, for the purposes of illustration, the trusted delegate entity 25 will hereinafter be described in terms of the TCPA architecture. Accordingly, a brief outline of the salient features of a TCPA platform will next be given.

A trusted platform built according to today's TCPA specifications incorporates a trusted platform subsystem typically comprising a Trusted Platform Module (TPM) in the form of a hardware chip separate from the main processor, a Root of Trust for Measurement (RTM) formed by the first software to run during the boot process, and support software termed the Trusted platform Support Service (TSS) which performs various functions such as those necessary for communication with the rest of the platform. The RTM and associated measurement agents carry out integrity measurements (integrity metrics) on the platform at various stages and store the results in a measurement log in ordinary memory; however, a condensed summary is also stored in Platform Configuration Registers (PCRs) of the TPM.

In addition to the PCRs, the TPM comprises a processor and various cryptographic functions as well as memory for permanently holding secrets such as the private TPM endorsement key and the storage root key (SRK). With regard to the SRK, the TPM supports a Protected Storage mechanism in the form of a hierarchy (tree) of data objects the root of which is the SRK; apart from the SRK that is permanently stored in the TPM (and not released from it), the tree can be stored outside of the TPM. When information in a node is used or revealed, the node is manipulated by the TPM. Each intermediate node object in the tree is encrypted by a key in the node object above it in the tree (the parent node), all the way back to the SRK root node. Intermediate nodes in the tree are keys but leaf nodes can be arbitrary data (though frequently they will also be keys, such as symmetric keys for use by application processes in protecting bulk data).

Access to keys in the key hierarchy (and thus to the data protected by the keys) can be made dependent on the current state of the platform as indicated by the values held in the PCRs. The relevant TCPA functions are TPM_Seal and TPM_Extend which enable a TPM to conceal nodes unless the value of current PCR is the same as stored PCR values. This sealing process ("Seal") enables enforcement of the software environment (PCRs) that must exist before data can be revealed, and simultaneously provides a method of concealing data (because the TPM releases a decryption key) until that environment exists. Seal is therefore an access control that depends on the previous state(s) of a platform (represented in terms of PCRs). Seal permits the creator of data to dictate the software environment that must exist in a platform when the data is used.

A TCPA trusted platform also includes functionality enabling a remote entity to check the trusted platform status of the platform and to securely interface with the platform, for example, to store keys and data in Protected Storage for unsealing only when the PCRs hold values corresponding to the running of a particular process (such as one provided by the remote entity) in a benign,—that is, subversion-resistant—environment.

Returning more specifically to the trusted delegate entity 25 of FIG. 3, three particular functional components of the entity 25 are shown, these being a trusted integrity checking module 26, a secure storage module 27, and an IBE key generation module 28. The integrity checking module 26 represents the above-mentioned TCPA functionality for enabling a remote entity to check the trusted platform status of the entity 25. The secure storage module 27 is embodied as TCPA Protected Storage and holds the private data p,q and the party's profile data loaded from the trusted authority 40. The IBE key generation module 28 is embodied as a process, provided by the trusted authority 40, arranged to generate the IBE decryption key upon finding that the conditions in the IBE encryption key EKS used by the service provider 30 are met by the profile data stored in the module 27. The private data p,q and the profile data are only released to the key generation process 28 if the PCR values indicate that the process is executing in a benign environment (the required PCR values are specified by the trusted authority 40).

The implementation of the trusted delegate entity 25 as a trusted platform as described above ensures that protection against subversion is given to the private data p,q, the profile data and the key generation process, enabling the service provider to place trust in the entity 25.

To ensure that only the party whose profile data is stored by the trusted delegate can use the entity 20 to obtain service provision from the service provider 30, the key generation module 28 is preferably arranged to require the user party to authenticate his/herself (for example, by inputting a PIN number or presenting a fingerprint) before the module 28 provides the decryption key to the decryption module 22.

Furthermore, the IBE decryption module 22 is preferably also implemented as a process executing in a benign environment on the same trusted platform as used by the entity 25, the process being arranged not to reveal the IBE decryption key outside of the platform (in particular, not to the requesting party nor any external entity). The purpose of doing this is to ensure that the decryption key cannot be passed on to another party (which may, in any case, be of limited usefulness if the service provider includes a nonce in the encryption key each time it is used).

The service-provider entity 30 comprises a control module 31 for controlling the operations, to be described below, that ensure (in cooperation with the trusted delegate entity) that service provision is limited to parties meeting specific service access conditions; a service provision module 32 arranged to effect service provision as permitted by the control module 31; an IBE encryption module 33 for encrypting data using an encryption key EKS that specifies the service access conditions (in the present example the module 33 is arranged to implement the QR IBE method and therefore employs, in addition to the condition-specifying encryption key, the public data N and hash function #); and a communications module for communicating with the entities 20 and 40.

The exact manner in which the service access conditions are specified in the IBE encryption key EKS is not critical and could be done simply by setting or resetting bits to indicate whether or not respective corresponding features are required. In a more sophisticated approach, the service access conditions are specified by being expressed in XML. Of course, however the conditions are specified, it must be possible for the module 28 of the trusted delegate to correctly interpret these conditions and map them to the profile data of the party 20; this interpretation may be possible simply on the basis of the encryption key data itself or may require the use of auxiliary data separately available from the service provider.

The trusted authority entity 40 comprises a control module 41 for controlling the operations, to be described below, for delegating authority to the trusted delegate entity 25; a database 42 holding profile data about the requesting party 20 (typically as one profile amongst many held by the trusted authority); a cryptographic module 43 arranged to generate a certificate indicating that the entity holding the private data p, q corresponding to the public data N included in the certificate is a trusted delegate of the authority 40; and a communications module 44 for communicating with the entities 20 and 40.

The certificate concerning the public data N that is produced by the module 43 is digitally signed using a locally-held private key of a public/private key pair associated with the trusted authority. In the present example, it will be assumed that this certificate is made available to the service provider via the party 20; however, it is also possible to arrange for the certificate to be provided directly from the authority 40 to the service provider 30 or to be posted in a public forum.

Having described the components of entities 20, 30 and 40, a description will now be given of the process by which the requesting party gains access to a service available from the service provider. In the FIG. 3 embodiment, this process comprises the following steps:

[1] The first stage in the overall process is for the trusted authority 40 to delegate its authority in respect of the profile data about party 20 to the trusted delegate entity 25. As a first step in achieving this, the trusted authority 40 authenticates the entity 20 and its user by any suitable means (for example, by personal presence with suitable credentials, or by cryptographic means well known to persons skilled in the art); the entity 20 will generally also authenticate the trusted authority 40. The trusted authority 40 then checks the trusted platform status of the entity 20 or at least the portion of it providing the trusted delegate entity 25; this is done using the trusted integrity checking module 25. In fact, the trusted authority 40 may carry out this latter step first if authentication of the entity 20 relies on secure storage of cryptographic keys within the trusted platform. Using Trusted platform Support Services, the trusted authority 40 now transfers to the entity 20 software code constituting the IBE key generation module 28, and a copy of the relevant profile data. The profile data is stored in the Protected Storage (module 27) of the trusted platform. The TPM of the trusted platform (or, alternatively, the trusted authority 40) generates a public/private key pair to be used as the public/private data (base key pair) N/p,q. The private data p,q is also installed in the Protected Storage whilst the public data N is certified by the trusted authority 40, using its own private key, to indicate that the corresponding private data p,q is held by a trusted delegate. The profile data and the private data p,q are sealed for release against PCR values set by the trusted authority and corresponding to the key generation process 28 executing in a benign environment on the trusted platform. The trusted authority 40 will generally also provide the entity 20 with software code for implementing the IBE decryption module 22 and for carrying out the required coordination and control functions of module 21 for gaining access to the service offered by the service provider; however, this software code can be provided from other sources. At the end of this phase, the trusted authority 40 has set up the trusted delegate entity 25 to act on its behalf in respect of the profile data concerning the party using the entity 20.

[2] Upon the party 20 wishing to receive service from the service provider 30, the interface and control module 21 is used to send a service request to the service provider 30. Along with this request the party 20 also sends the certificate provided by the trusted authority concerning the public data N; the party 20 may also send a certificate concerning the public key of the trusted authority if that key is certified by a higher authority.

[3] Upon the service request being received at the service provider 30, the control module 31 first checks that the certificate for N is genuine—that is, it has really been produced by the trusted authority; this check is carried out in standard manner using the public key of the trusted authority (after confirmation of its authenticity). If the certificate of N is genuine, the service provider knows that it can trust (to the extent it trusts the trusted authority 40) that the entity holding the private data p,q corresponding to the public data N, is a trusted delegate entity. Next, the control module 31 may opt to reassure itself that the entity 20 comprises a trusted platform; the module 31 does this using the trusted integrity checking module 26. Provided all these preliminary checks are passed, the control module 31 causes the IBE module 33 to encrypt an arbitrary message using both the public data N and an encryption key EKS comprising the service-access conditions and, optionally, a nonce (random number) or other unpredictable string. The control module 31 returns the encrypted message to the requesting party 20 together with the encryption key EKS used.

[4] The interface and control module 21 of the entity 20, on receiving the encrypted message, passes it to the IBE decryption module 22 together with the associated encryption key EKS. The module 22 temporarily stores the message and passes on the encryption key EKS to the IBE key generation module 28 with a request for the corresponding decryption key.

Assuming that the IBE key generation process 28 has been started in a benign environment corresponding to the PCR values used to seal the profile data and the private data p,q in Protected Storage 27, the process 28 can access these items first to check whether the profile data satisfies the service access conditions, and if so, then to generate the decryption key corresponding to the supplied encryption key. Before the decryption key is provided to the module 22, the process carries out an authentication check on the party using the entity 20, the decryption key only being provided if this check confirms that the party is the party to which the profile data applies. It will be appreciated that generation of the decryption key, rather than being effected between the condition check and the user authentication check, can alternatively be carried out either before the service-access conditions check or after the user authentication check; in all three cases, provision of the decryption key to the module 22 only takes place if both checks are passed.

The IBE decryption module 22 uses the decryption key to decrypt the temporarily-stored message previously received from the service provider 30. The decrypted message is then sent back by the interface and control module 21 to the service provider 30 to prove that the party 20 meets the service-access conditions.

[5] The control module 31 of the service-provider entity 30 checks that the decrypted message matches the original message and if this is case, then enables the service provision module 32 to proceed with provision of the service requested by the party 20.

In a variant of the FIG. 3 process, the encrypted data sent by the service provider 30 to the requesting party (arrow [3] in FIG. 3) is a data component of the service, such as software, digital media content, or, indeed, any data; the requesting party can only access (decrypt) and use the data component if the profile data of that party satisfies the conditions specified in the IBE encryption key EKS. In this case, steps [4] and [5] will generally not be needed.

Figure 4:
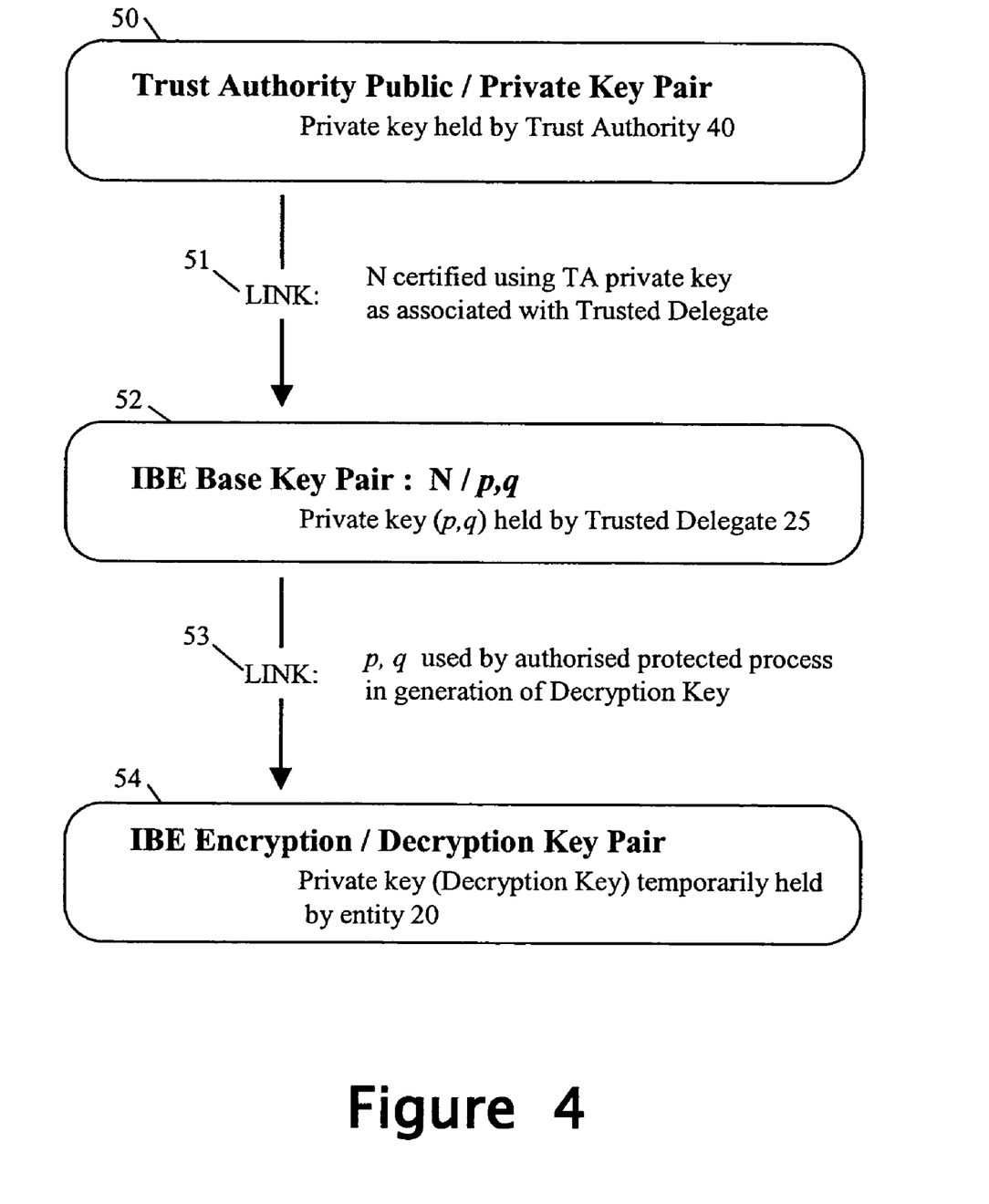
FIG. 4 is a diagram of a key-pair chain employed in the FIG. 3 embodiment.

The above-described embodiment of FIG. 3 effectively provides trustable delegation by providing a chain of key pairs linked in a subversion-resistant manner. More particularly, and as illustrated in FIG. 4, this chain comprises:
- a first key pair 50 formed by the trusted authority's public/private key pair, the private key being held in the cryptographic module 43 of the trusted authority 40;
- a second key pair 52 formed by the IBE base key pair, that is, the public data N and the private data p,q, the latter being stored in the Protected Storage 27 of the trusted delegate entity 25; and
- a third key pair 54 formed by the IBE encryption/decryption key pair, the decryption key being temporarily held in the entity 20.

The link 51 between the first and second key pairs 50 and 52 is provided by the certification of the public data N using the trusted authority's private key—the service provider 30 can rely on this certificate (after checking that it is genuine) as indicating that the entity holding the corresponding private data p,q is an entity to which the trusted authority 40 has delegated its authority. By using the public data N in encrypting the data to be sent to the party 20, the service provider thereby reassures itself that only a trusted delegate has the corresponding private data. The link 51 is thus cryptographic in nature though it relies on the security with which the trusted authority 40 and the entity 25 respectively store the private key of the first and second key pairs.

The link 53 between the second and third key pairs 52 and 54 is provided by the key generation process 28 which uses the private data p,q to generate the IBE decryption key—since the process 28 can only access the private data p,q and the profile data if it is executing in a benign environment, the service provider can trust this link if the service provider trusts that the process 28 is running on a trusted platform (the service provider may either accept this on the basis that the trusted authority 40 is presumed to have checked this, or may decide to use the trusted integrity module 26 itself to confirm that the entity 25 is implemented on a trusted platform).

It should be noted that the chain of key pairs 50-54 is incomplete at the stage immediately following the delegation of authority from the trusted authority 40 to the trusted delegate entity 25 (that is, at the end of phase [1] in FIG. 3); this is because the final key pair—the IBE encryption/decryption key pair 54 has not yet been generated. This latter key pair is generated at each service request.

Figure 5:
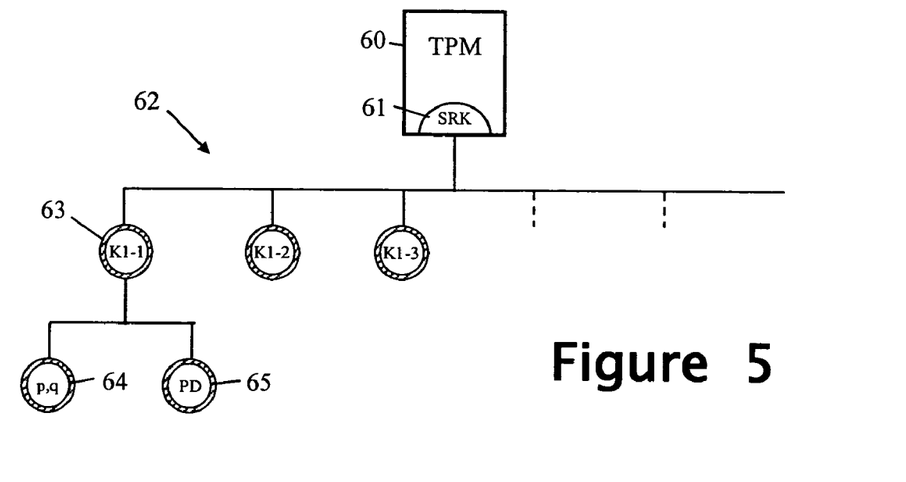
FIG. 5 is a diagram of a protected-storage key hierarchy used in a second embodiment of the present invention.

In the FIG. 3 embodiment, there are three key pairs in the trust chain from the trusted authority 40 to the IBE decryption key. It is also possible to provide a trust chain with more key pairs and FIGS. 4 and 5 illustrate a second embodiment of the invention in which there are four key pairs in the trust chain. This second embodiment is similar to the FIG. 3 embodiment and has the same basic components including a trusted delegate entity based on a TCPA trusted platform (for ease of understanding, the following description of the second embodiment uses references to the corresponding components of the FIG. 3 embodiment, where appropriate). The main difference between the FIG. 3 embodiment and the second embodiment is that in the latter, rather than the trusted authority 40 certifying the public data N, it certifies a public key of a key pair associated with the trusted delegate entity 25, this key pair then linking to the IBE public/private base key pair (formed by N and p,q where the QR IBE method is being used).

More particularly, FIG. 5 illustrates part of the Protected Storage object hierarchy 62 of the second embodiment, this hierarchy having as its root the Storage Root Key (SRK) 61 that resides permanently inside the Trusted Platform Module (TPM) 60 of the trusted platform upon which the trusted delegate entity 25 is based. The SRK 61 is used to encrypt ("wrap") keys K1-1, K1-2, K1-3 etc. that form the next level of the hierarchy. The key K1-1 that forms the node 63 of the object hierarchy is the private key of the aforesaid key pair associated with the trusted delegate entity 25, the public key of this key pair being the key certified by the trusted authority 40. The key K1-1 is used to wrap two dependent objects 64 and 65 respectively formed by the private data p,q and the profile data "PD" of the party associated with the entity 20. The hatched outer annulus around each object in the FIG. 5 key hierarchy 62 is a graphical indication that each object is wrapped (encrypted).

The key K1-1 is sealed against the PCR values associated with a particular process running in a benign environment on the trusted platform. The software code for this process is provided by the trusted authority 40 and comprises process code for responding to an authentication challenge made using the public key of the trusted delegate entity, and the process code forming the key generation module 28.

In operation, the service provider 30 receives the certified public key of the trusted delegate entity 25 along with a service request from the party 20. The service provider uses this key to challenge the entity 25 which must respond by using the corresponding private key K1-1 which it can only do by starting the aforesaid particular process in a benign environment thereby enabling the node 63 to be unsealed and key K1-1 revealed to the process. The process must go through this challenge response phase before it can enter its next phase in which, in response to decryption-key request from module 22, the process carries out the condition-checking and key-generation functions of the module 28 described above with respect to the FIG. 3 embodiment. In this next phase, the key K1-1 is used to unwrap the private data (base key) p,q and the profile data (which need not have been sealed as they are encrypted with K1-1).

Figure 6:
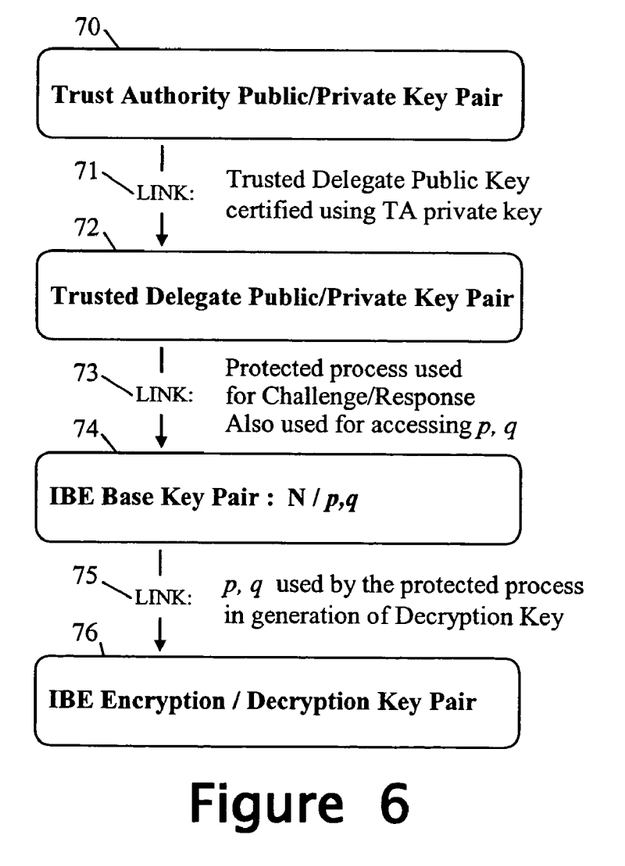
FIG. 6 is a diagram of a key-pair chain employed in the FIG. 5 embodiment.

FIG. 6 summarises the trust chain established in the second embodiment, this chain comprising the following key pairs:
- a first key pair 70 formed by the trusted authority's public/private key pair, the private key being held in the cryptographic module 43 of the trusted authority 40;

a second key pair 72 formed by the public/private key pair associated with the trusted delegate entity 25, the private key K1-1 of this key pair being stored in the Protected Storage 27 of the entity 25;

a third key pair 74 formed by the IBE base key pair, that is, the public data N and the private data p, q, the latter being stored in the Protected Storage 27 of the trusted delegate entity 25; and a fourth key pair 76 formed by the IBE encryption/decryption key pair, the decryption key being temporarily held in the entity 20.

The links between the key pairs are as follows:

a link 71 between the first and second key pairs 70 and 72 provided by the certification of the public key of the second key pair using the trusted authority's private key;

a link 73 between the second and third key pairs 72 and 74 provided by having the same process both respond to the authentication challenge (by using the private key K1-1) and access the private data p,q; and a link 75 between the third and fourth key pairs 74 and 76 provided by the use of the private data p,q in generating the IBE decryption key.

As with the trust chain of the FIG. 3 embodiment, the trust chain of the second embodiment is incomplete immediately following delegation of authority to the entity 25, the chain only being completed when the IBE encryption and decryption keys are generated as a result of a service request being made.

In the preceding trust chain example, the link between the second and third key pairs relied upon the trusted platform status of the entity 25, that is, based on the integrity checking of the platform, the service provider is convinced that the platform uses the third key pairs for the purpose of generating the end decryption key if and only if the platform is running a specific process making use of the second key pair, where the process has been approved by the original trusted authority. In a variant, this link is made a link verifiable by the service provider; making the link verifiable is done by certifying the public key of the third key pair (that is, the public data N) using the private key of the second key pair.

Persons skilled in the art will appreciate that the trust chain can take many different forms and can even involve key pairs associated with entities other than the trusted authority 40 and the trusted delegate entity 25. Advantageously, the or each link in at least the portion of the trust chain extending from the starting key pair to the penultimate key pair is made verifiable by a party wishing to rely on the delegation of authority to the device from the trusted authority. In this case, at least one of the verifiable links (and possibly every one of these links) is verifiable as a result of the public key of the downstream key pair associated with the link being certified using the private key of the upstream key pair associated with that link.

It will also be appreciated that many other variants are possible to the above described embodiments of the invention. For example, the present invention is not limited to the QR IBE method used in the above-described embodiments and other cryptographic methods can be used such as those mentioned above that make use of Weil or Tate pairings, or are RSA based.

The data provided by the trusted authority against which the access-control conditions are tested need not be limited to profile data about the user of the entity 20 and can be any other type of data such as data about the entity 20 itself or its surroundings. It should also be noted that this data may not be confidential data and where the data is non-confidential, the module can be arranged to output the data to a user; however, the data does need to be stored in a manner that is subversion resistant, as is the case in the described embodiments.

Furthermore, at least one condition specified by the service provider 30 in the encryption key EKS may be a condition to be met by input data presented by the user of the device (for example, the user may be required to present biometric data such as a thumb print).

Such a condition may simply be that a certain type of input data must be presented without requiring a particular value for that data (for example, in order to keep a record of users); however, the condition may also require a specific value for the input data. Where a specific input-data value is required, this value is preferably not included in the encryption key but is either a value stored in the user's profile data or a value passed to the trusted delegate entity 25 by the service provider in encrypted form (either as data encrypted under the IBE encryption key or under a different key). It will be appreciated that any combination of one or more conditions to be checked against input or stored data can be specified by the service provider and that in some cases it will not be necessary to store data provided by the trusted authority 40 in order to check the condition(s) specified. In fact, embodiments are envisaged in which no conditions are explicitly specified by the service provider such as where the sole condition set on the provision of the IBE encryption key EKS by the IBE key generation process 28 is that the party using the entity 30 can authenticate themselves to the trusted delegate entity 25.

Whilst the key generation module 28 is described above as having been provided by the trusted authority, it could alternatively be provided by any other entity since in the embodiment concerned, any attempt at modifying it will render it unable to access the profile data and the private data p,q as a result of these latter being sealed for release against a specific PCR value set by the trusted authority. In fact, the release PCR value can, in appropriate circumstances, be set by an entity other than the trusted authority, such as the service provider.

In the above-described embodiments, the trusted delegate entity 25 had authority delegated to it from a single trusted authority 40. However, it is also possible to arrange for the entity 25 to act as a trusted delegate for multiple trusted authorities where typically each such authority is competent in respect of one or more particular types of data relevant to the party 20. In this case, each trusted authority independently delegates its authority to the trusted delegate entity and there exists a unique IBE public/private base key pair for each such delegation. Preferably, the certificate issued by each authority indicates the data for which the issuing authority is competent. In applying the service-access conditions, the service provider can proceed in a number of different ways to ensure that each condition is tested against data from the appropriate trusted authority. For example, in the case of the FIG. 3 embodiment, the following approaches can be used:

for each group of one or more access-control conditions associated with a particular trusted authority 40, the service provider can encrypt a different item of data for sending to the requesting party using that group of conditions as the IBE encryption key EKS and the public data certified by the trusted authority concerned; the entity 20 handles each encrypted item in the manner described above with respect to the FIG. 3 embodiment and the service provider only provides the requested service if the requesting party returns all the data items correctly decrypted.

the service provider organises the service as a number of data strings (say n strings, by using Shamir's secret sharing scheme) with each string being associated with a group of one or more conditions to be tested against the data of a respective one of the trusted authorities. The service provider then encrypts each string using the associated group of conditions as the IBE encryption key EKS and the IBE public base key of the corresponding trusted authority; in order to retrieve the service, the requesting party has to decrypt all of the strings—because any n−1 strings or less cannot disclose any information of the service.

the service provider can use the data encrypted in respect of a group of one or more access-control conditions (using the group of conditions as the encryption key EKS and the IBE public base key of the trusted authority concerned) as the data to be encrypted in respect of the next group of conditions, the encrypted data resulting from the encryption effected in respect of all said conditions then being sent to the requesting party for decryption in successive decryption operations. This can be expressed as:

Encryption: ciphertext=$E\{K\_TAn, E\{K\_TAn-1, \ldots E\{K\_TA1, data\} \ldots \}$ Decryption: data=$D\{K'\_TA1, D\{K'\_TA2, \ldots D\{K'\_TAn, \text{ciphertext}\} \ldots \}$ where K_TAn is encryption key used in relation to the trusted authority TAn, K'_TAn is decryption key issued by TAn the service provider can encrypt a data item using a public base key (e.g. N) associated with each of the trusted authorities, decryption of the encrypted item only being possible by obtaining a decryption sub-key from the trusted delegate entity acting for each trusted authority in turn. This can be expressed as:

Encryption: ciphertext=$E(K\_\text{all}, \text{data})$

Decryption: data=$D(K\_\text{all}, \text{ciphertext})$ where K_all is encryption key related to all trusted authorities, K'_all is the corresponding decryption; key K'_all is retrieved from all decryption sub-keys.

Further information about how multiple trusted authorities can be used is given in:

Chen L., K. Harrison, A. Moss, N. P. Smart and D. Soldera. "Certification of public keys within an identity based system" *Proceedings of information Security Conference* 2002, ed. A. H. Chan and V. Gligor, LNCS 2433, pages 322-333, Springer-Verlag, 2002.

Whilst the invention has been described above in relation to arrangements where there is a service provider providing a service, these arrangements all rely on the ability of the party 20 to decrypt data provided to it in encrypted form. It will therefore be appreciated that embodiments of the invention may relate directly to data access control without there being an explicit associated service or service provider.

The invention claimed is:

1. A method of delegating key-provision authority to a device from a trusted authority, the method comprising providing a yet-to-be completed chain of public/private cryptographic key pairs linked in a subversion-resistant manner and comprising: a starting key pair formed by a public/private key pair of the trusted authority, a penultimate key pair formed by public/private data, the private data being securely stored in the device for access only under circumstances that have been pre-authorised by the trusted authority and comprise a specific key-generation process running in a subversion-resistant operating environment, and a link between the penultimate key pair and an end key pair to be formed by an encryption/decryption key pair of an Identifier-Based Encryption, IBE, scheme; this link being said key-generation process arranged to execute in said subversion-resistant operating environment on the device to generate said decryption key using said private data and the IBE encryption key and to make the generated key available for use.

2. A method according to claim 1, wherein said key-generation process is arranged to check that at least one condition has been satisfied before the process generates the decryption key and/or makes the key available for use.

3. A method according to claim 2, wherein said at least one condition comprises a condition to be presented to the device in said encryption key.

4. A method according to claim 3, wherein said condition indicated in said encryption key is a condition that is to be met by particular data stored in the device, this data having been provided by the trusted authority and stored in the device protected against subversion.

5. A method according to claim 3, wherein said condition indicated in said encryption key is a condition that is to be satisfied by input data presented by a user of the device.

6. A method according to claim 2, wherein said at least one condition comprises a condition to be presented in encrypted form to the device.

7. A method according to claim 2, wherein said at least one condition comprises a condition that input data presented by a user of the device has a predetermined relationship with particular data stored in the device and protected against subversion.

8. A method according to claim 7, wherein said at least one condition is a user authentication condition concerning a current user of the device.

9. A method according to claim 1, wherein said yet-to-be completed chain of public/private cryptographic key pairs will have three key pairs, so that the penultimate key pair is the second key pair in said chain, the start key pair and penultimate key pair being linked by said public data being certified by the trusted authority, using its private key, to indicate that an entity holding the corresponding said private data is one to which it has delegated authority.

10. A method according to claim 1, wherein said yet-to-be completed chain of public/private cryptographic key pairs will have three key pairs, so that the penultimate key pair is the third key pair in said chain, there being a second key pair between the start key pair and the third key pair in said chain, the private key of the second key pair being securely stored in the device, and the start key pair and the second key pair being linked by the public key of the second key pair being certified by the trusted authority, using its private key, to indicate that an entity holding the private key of the second key pair is one to which it has delegated authority; the second key pair being linked to the penultimate key pair by said key-generation process being arranged to be activated in order to respond to a challenge based on the public key of the second key pair before attempting to complete said chain by providing said decryption key.

11. A method according to claim 1, wherein the private key of at least one key pair of said chain, additional to the first key pair, is held outside said device.

12. A method according to claim 1, wherein the or each link in at least the portion of the chain extending from the starting key pair to the penultimate key pair is verifiable by a party wishing to rely on the delegation of authority to the device from the trusted authority.

13. A method according to claim 12, wherein at least one of the verifiable links is verifiable as a result of the public key of the downstream key pair associated with the link being certified using the private key of the upstream key pair associated with that link.

14. A method according to claim 1, wherein the device comprises a trusted platform arranged to execute the key-generation process in said subversion-resistant operating environment.

15. A method according to claim 14, wherein the trusted authority checks the trusted platform status of the device.

16. A method according to claim 14, wherein said public data is held in protected storage and only accessible by the key-generation process when executing in said subversion-resistant operating environment.

17. A method according to claim 4, wherein the device comprises a trusted platform arranged to execute the key-generation process in said subversion-resistant operating environment, said public data and said particular data being held in protected storage and only accessible by the key-generation process when executing in said subversion-resistant operating environment.

18. A method according to claim 17, wherein said particular data is profile data for a party associated with the device.

19. A data access control method involving delegated authority, the method comprising: attempting to complete a chain of public/private cryptographic key pairs linked in a subversion-resistant manner and comprising: a starting key pair formed by a public/private key pair of a trusted authority, a penultimate key pair formed by public/private data, the private data being securely stored in a device for access under circumstances that have been pre-authorised by the trusted authority and comprise a specific key-generation process running in a subversion-resistant operating environment, and a link between the penultimate key pair and an end key pair to be formed by an encryption/decryption key pair of an Identifier-Based Cryptographic, IBE, scheme; this link being said key-generation process arranged to execute in said subversion-resistant operating environment on the device to provide the IBE decryption key, generated using said private data and the IBE encryption key, attempted completion of said chain being effected by executing said key-generation process in said subversion-resistant operating environment on the device; and where execution of the key-generation process results in the provision of the decryption key, using the decryption key to decrypt data encrypted using said public data and said IBE encryption key.

20. A method according to claim 19, wherein said key-generation process checks that at least one condition has been satisfied before the process generates the decryption key and/or makes the key available for use.

21. A method according to claim 20, wherein said at least one condition comprises a condition presented to the device in the IBE encryption key.

22. A method according to claim 21, wherein said condition indicated in said IBE encryption key is a condition that is checked by reference to particular data stored in the device, this data having been provided by the trusted authority and stored in the device protected against subversion.

23. A method according to claim 21, wherein said condition indicated in said IBE encryption key is a condition that is checked by reference to input data presented by a user of the device.

24. A method according to 21, wherein said at least one condition comprises a condition that is checked by comparing input data presented by a user of the device with particular data stored in the device, this data having been provided by the trusted authority and stored in the device protected against subversion.

25. A method according to claim 20, wherein said at least one condition comprises a condition presented in encrypted form to the device.

26. A method according to claim 19, wherein said penultimate key pair is the second key pair in said chain, the start key pair and penultimate key pair being linked by said public data being certified by the trusted authority, using its private key, to indicate that an entity holding the said private data is one to which it has delegated authority.

27. A method according to claim 19, wherein said penultimate key pair is the third key pair in said chain, there being a second key pair between the start key pair and the third key pair in said chain, the private key of the second key pair being securely stored in the device, and the start key pair and the second key pair being linked by the public key of the second key pair being certified by the trusted authority, using its private key, to indicate that an entity holding the private key of the second key pair is one to which it has delegated authority; the second key pair being linked to the penultimate key pair by said key-generation process being activated in order to respond to a challenge based on the public key of the second key pair before attempting to complete said chain by providing said decryption key.

28. A method according to claim 19, wherein the private key of at least one key pair of said chain, additional to the first key pair, is held outside said device.

29. A method according to claim 19, wherein the or each link in at least the portion of the chain extending from the starting key pair to the penultimate key pair is verified by a party wishing to rely on the delegation of authority to the device from the trusted authority.

30. A method according to claim 29, wherein at least one of the verified links is verified on the basis of a certificate for the public key of the downstream key pair associated with the link, this certificate being a certificate certified using the private key of the upstream key pair associated with that link.

31. A method according to claim 19, wherein the device comprises a trusted platform arranged to execute the key-generation process in said subversion-resistant operating environment.

32. A method according to claim 31, wherein said public data is held in protected storage and only accessible by the key-generation process when executing in said subversion-resistant operating environment.

33. A method according to claim 19, wherein the encrypted data is data encrypted by a service provider, decryption of the encrypted data being required in order to gain access to a service provided by the service provider.

34. A method according to claim 33, wherein the encrypted data provided by the service provider is a data component of the service.

35. A method according to claim 33, wherein the encrypted data provided by the service provider is arbitrary data, the method further comprising returning the decrypted data to the service provider as evidence that said conditions have been met, and the service provider thereafter providing said service to the party.

36. A method according to claim 33, wherein the device comprises a trusted platform arranged to execute the key-generation process in said subversion-resistant operating environment, the service provider checking the trusted platform status of the device before providing said service.

37. A system comprising:
 a trusted authority entity including secure storage means for securely storing a private key of a first public/private key pair, and a device arranged to serve as a delegate for said trusted authority, the device including secure storage means; the system being arranged to host at least the private keys of a chain of public/private cryptographic key pairs that are linked in a subversion-resistant manner, this chain comprising:

a starting key pair formed by said first key pair, a penultimate key pair formed by public/private data; and an end key pair formed by an encryption/decryption key pair of an Identifier-Based Encryption, IBE, scheme; the secure storage means of the device being arranged to securely store said private data for access only by authorised means pre-authorised by the trusted authority, the device further including said authorised means for linking said penultimate and end key pairs, said authorised means being arranged to provide said decryption key, generated using said private data and said IBE encryption key, only if at least one condition is satisfied, said at least one condition comprising a condition indicated in the encryption key.

38. A system according to claim 37, wherein said condition indicated in said encryption key is a condition that is to be met by particular data stored in the device and protected against subversion, the said authorised means being arranged to check this condition by reference to said particular data.

39. A system according to claim 37, wherein said condition indicated in the encryption key is a condition that is to be satisfied by input data presented by a user of the device, the device including input means for receiving said input data and the said authorised means being arranged to check the condition indicated in the encryption key by reference to said input data.

40. A system according to claim 38, wherein said condition indicated in the encryption key is a condition that input data presented by a user of the device has a predetermined relationship with particular data stored in the device and protected against subversion, the device including input means for receiving said input data and the said authorised means being arranged to check the condition indicated in the encryption key by comparing said input data with said particular data.

41. A system according to claim 37, in which the private key of the first key pair is securely stored in the storage means of the trusted authority entity, and said private data is securely stored in the storage means of the device.

42. A system according to claim 37, wherein said penultimate key pair is the second key pair in said chain, the trusted authority entity being arranged to provide the link between the start key pair and penultimate key pair by using the private key of the first key pair to certify said public data such as to indicate that an entity holding the corresponding private data is one to which it has delegated authority.

43. A system according to claim 37, wherein said authorised means is a key-generation process and a subversion-resistant operating environment for running said key-generation process.

* * * * *